US009158813B2

(12) United States Patent
Ntoulas et al.

(10) Patent No.: US 9,158,813 B2
(45) Date of Patent: Oct. 13, 2015

(54) RELAXATION FOR STRUCTURED QUERIES

(75) Inventors: Alexandros Ntoulas, Mountain View, CA (US); Sreenivas Gollapudi, Cupertino, CA (US); Samuel Ieong, Mountain View, CA (US); Stelios Paparizos, Mountain View, CA (US); John Christopher Shafer, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 670 days.

(21) Appl. No.: 12/796,678

(22) Filed: Jun. 9, 2010

(65) Prior Publication Data

US 2011/0307517 A1 Dec. 15, 2011

(51) Int. Cl.
*G06F 17/30* (2006.01)
(52) U.S. Cl.
CPC .... *G06F 17/30451* (2013.01); *G06F 17/30864* (2013.01); *G06F 17/30861* (2013.01)
(58) Field of Classification Search
CPC ............... G06F 17/30864; G06F 17/30861
USPC ........................................................ 707/765
See application file for complete search history.

(56) References Cited

U.S. PATENT DOCUMENTS

| 5,768,423 | A  | * | 6/1998  | Aref et al. ............... 382/228 |
| 6,505,205 | B1 | * | 1/2003  | Kothuri et al. .............. 1/1 |
| 7,299,221 | B2 |   | 11/2007 | Alpha et al. |
| 2002/0103793 | A1 | * | 8/2002 | Koller et al. .................. 707/3 |
| 2003/0097357 | A1 | * | 5/2003 | Ferrari et al. ................. 707/3 |
| 2005/0076015 | A1 | * | 4/2005 | Dettinger et al. ............. 707/3 |
| 2008/0250008 | A1 |   | 10/2008 | Gollapudi et al. |
| 2009/0024607 | A1 | * | 1/2009 | Sun et al. ...................... 707/5 |
| 2010/0010989 | A1 |   | 1/2010 | Li et al. |
| 2010/0106713 | A1 |   | 4/2010 | Esuli et al. |

OTHER PUBLICATIONS

Nambiar, Ullas, and Subbarao Kambhampati. "Answering imprecise queries over autonomous web databases." Data Engineering, 2006. ICDE'06. Proceedings of the 22nd International Conference on. IEEE, 2006.*

Li, Wen-Syan, et al. "WebDB: A web query system and its modeling, language, and implementation." Research and Technology Advances in Digital Libraries, 1998. ADL 98. Proceedings. IEEE International Forum on. IEEE, 1998.*

(Continued)

*Primary Examiner* — Sherief Badawi
*Assistant Examiner* — Nan Hutton
(74) *Attorney, Agent, or Firm* — Steve Wright; Judy Yee; Micky Minhas

(57) ABSTRACT

A structured query may specify attribute values for attributes. An estimate of the number of items that will match the structured query if it is applied to a structured database is determined. If the estimated number of items is below a threshold, the structured query may be relaxed to form new candidate structured queries. The number of candidate queries may be determined based on a desired running time. Each of the candidate structured queries may be determined by changing one or more attribute values of the attributes of the structured query. Estimates of the number of items each of the candidate structured queries will match is determined, and the candidate structured query that has the highest matching estimation is used to query the database. The matching results may be output.

19 Claims, 5 Drawing Sheets

(56) References Cited

OTHER PUBLICATIONS

Dolog, Peter, et al. "The personal reader: Personalizing and enriching learning resources using semantic web technologies." Adaptive Hypermedia and Adaptive Web-Based Systems. Springer Berlin Heidelberg, 2004.*

Gao, et al., "Algorithms for constrained k-nearest neighbor queries over moving object trajectories", Retrieved at << http://gisandscience.com/2010/04/05/algorithms-for-constrained-k-nearest-neighbor-queries-over-moving-object-trajectories/ >>, GeoInformatica, vol. 14, No. 2, Apr. 5, 2010, pp. 2.

Muslea, Ion., "Machine Learning for Online Query Relaxation", Retrieved at << http://www.isi.edu/~muslea/PS/kdd04.pdf >>, International Conference on Knowledge Discovery and Data Mining, Proceedings of the tenth ACM SIGKDD international conference on Knowledge discovery and data mining, Aug. 22-25, 2004, pp. 10.

Chakrabarti, et al., "Evaluating Refined Queries in Top-k Retrieval Systems", Retrieved at << http://gkmc.utah.edu/7910F/papers/IEEE%20TKDE%20evaluating%20top-k%20queries.pdf >>, IEEE Transactions on Knowledge and Data Engineering, vol. 16, No. 2, Feb. 2004, pp. 256-270.

Zhou, et al., "Query relaxation using malleable schemas", Retrieved at http://www.l3s.de/~balke/paper/sigmod07.pdf >>, International Conference on Management of Data, Proceedings of the 2007 ACM SIGMOD international conference on Management of data, Jun. 11-14, 2007, pp. 12.

Meng, et al., "Answering Approximate Queries over Autonomous Web Databases", Retrieved at << http://www2009.org/proceedings/pdf/p1021.pdf >>, International World Wide Web Conference, Proceedings of the 18th international conference on World wide web, Apr. 20-24, 2009, pp. 1021-1030.

Chen, et al., "Efficient Evaluation of All-Nearest-Neighbor Queries", Retrieved at << http://pages.cs.wisc.edu/~jignesh/publ/ann.pdf >>, Proceedings of the 23rd International Conference on Data Engineering, ICDE, Apr. 15-20, 2007, pp. 10.

Gaasterland, Terry, "Cooperative Answering through Controlled Query Relaxation", Retrieved at << http://ieeexplore.ieee.org/stamp/stamp.jsp?tp=&arnumber=621228 >>, IEEE Expert: Intelligent Systems and Their Applications, vol. 12, No. 5, Sep. 1997, pp. 48-59.

Koudas, et al., "Relaxing Join and Selection Queries", Retrieved at << http://flamingo.ics.uci.edu/pub/vldb06-jqr.pdf >>, Proceedings of the 32nd international conference on Very large data bases, Sep. 12-15, 2006, pp. 12.

Zhang, et al., "Quantile-Based KNN Over Multi-Valued Objects", Retrieved at << http://www.cse.unsw.edu.au/~lxue/paper/quantileKNN.pdf >>, Proceedings of the 26th International Conference on Data Engineering, ICDE, Mar. 1-6, 2010, pp. 12.

Hristidis, et al., "Efficient IR-Style Keyword Search over Relational Databases", Retrieved at << http://www.vldb.org/conf/2003/papers/S25P03.pdf >>, Proceedings of the 29th international conference on Very large data bases, vol. 29, Sep. 9-12, 2003, pp. 12.

Beecks, et al., "Efficient k-Nearest Neighbor Queries with the Signature Quadratic Form Distance", Retrieved at <<. . . >> In the proc. 4th International Workshop on Ranking in Databases, in conjunction with IEEE 26th International Conference on Data Engineering, 2010, pp. 10-15.

* cited by examiner

RELAXATION FOR STRUCTURED QUERIES

BACKGROUND

A number of applications on the Internet access structured data through keyword queries. Structured data may include data that is stored in a structured form (e.g., tuples) within repositories such as databases (relational, object, XML, etc.), delimited files, or other structured repositories. Structured data tuples often include attributes with each attribute taking on one of a set of possible attribute values. Typically, structured queries over structured data are evaluated in a strict fashion, i.e. the query-specified attributes and corresponding attribute values are matched exactly with the attributes and corresponding attributes of the structured data. Consider for example the following structured query submitted by a user to an online merchant:

{Brand:Sony, Color:Silver, Model:LCD, Size:42 inches}

In this structured query, the user is interested in finding silver-colored LCD televisions that are made by Sony and have a size of 42 inches. Although this structured query is relatively well-specified, if it is evaluated strictly very few or no results may be returned to the user. For example, there may be no silver-colored televisions that are 42 inches in size, or the only Sony LCD televisions may be 43 inches or other sizes other than 42 inches. Thus, it may be beneficial to "relax" the structured query provided by the user by changing one or more of the attribute values so that the user may receive a predetermined minimum number of results. However, determining which attribute values to relax is difficult because a user may become dissatisfied if returned results are too different than the original structured query, and there is only a finite amount of time during which relaxed attribute values may be considered before the user expects to receive results.

SUMMARY

A structured query may be received that specifies attribute values for one or more attributes. An estimate of the number of items that will match the structured query if it is applied to a structured database is determined. The estimate may be made using previously generated histograms of attribute values for each of the attributes in the structured database. If the estimated number of items is below a threshold number of items, the structured query may be "relaxed" to form multiple new candidate structured queries. The number of candidate queries generated may be proportional to a maximum running time (e.g., the number of candidate queries generated may be limited to fit within a maximum running time). Each of the candidate structured queries may be determined by changing one or more attribute values of the attributes of the structured query. Estimations of the number of items each of the candidate structured queries will match is determined, and the candidate structured query that has the highest matching estimation is used to query the structured database. The matching results may then be presented to a user who provided the structured query.

In an implementation, a query is received by a computing device, e.g. through a network. The query includes one or more terms. A first structured query is determined based on the terms of the received query by the computing device. A structured query includes one or more attribute values and each attribute value is associated with an attribute. An estimated number of items that match the first structured query is determined by the computing device. It is determined if the estimated number of items is below the threshold number of items. If the estimated number of items is below the threshold number of items a second structured query is determined from the first structured query, the plurality of items that match the second structured query is determined, and indicators of each of the determined items are provided by the computing device.

Implementations may include some or all of the following features. If the estimated number of items is above or equal to the threshold number of items a plurality of items that match the first structured query is determined, and indicators of each of the determined plurality of items are provided by the computing device through the network. Determining the second structured query from the first structured query by the computing device may include determining a plurality of candidate structured queries from the first structured query; for each candidate structured query of the plurality of candidate structured queries, estimating a number of items that match the candidate structured query; and determining the candidate structured query with the highest estimated number of items as the second structured query.

In an implementation, a threshold distance may be determined. For each candidate structured query of the first structured query, a maximum distance between the candidate structured query and the first structured query may be determined. The candidate structured query with the highest estimated number of items as the second structured query may be determined. The determined maximum distance of the determined candidate structured query may be less than the threshold distance.

In an implementation, determining a candidate structured query from the first structured query may include selecting an attribute of the first structured query, changing the attribute value corresponding to the selected attribute, determining an estimated number of items that match the first structured query with the changed attribute, determining if the estimated number of items that match the first structured query with the changed attribute is above the threshold number of items, and if so, determining the first structured query with the changed attribute as a candidate structured query. A maximum time duration may be received and the number of determined candidate structured queries may be proportional to the maximum time duration. The items may be consumer products. The structured query may be received through a form of a webpage.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
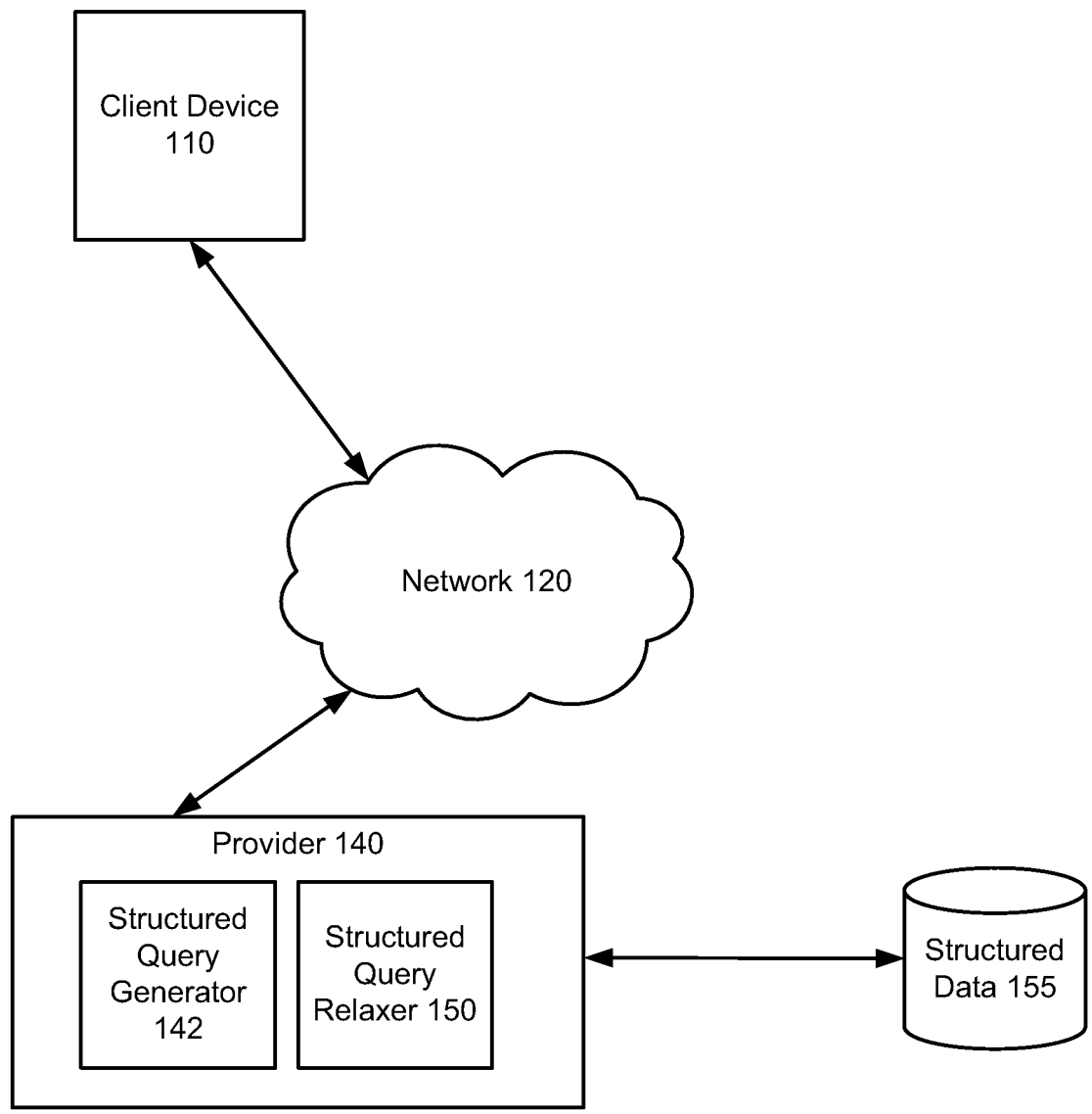
FIG. 1 is an illustration of an example environment for relaxing structured queries.

FIG. 1 is an illustration of an example environment 100 for relaxing structured queries. A client device 110 may communicate with a provider 140 through a network 120. The client device 110 may be configured to communicate with the provider 140 to access, receive, retrieve, and display content and other information such as webpages. The network 120 may be a variety of network types including the public switched telephone network (PSTN), a cellular telephone network, and a packet switched network (e.g., the Internet). Although only one provider 140 is shown in FIG. 1, it is contemplated that the client device 110 may be configured to communicate with more than one provider 140 through the network 120.

In some implementations, the client device 110 may include a desktop personal computer (PC), workstation, laptop, personal digital assistant (PDA), cell phone, or any WAP-enabled device or any other computing device capable of interfacing directly or indirectly with the network 120. The client device 110 may be implemented using one or more computing devices such as the computing system 500 described with respect to FIG. 5. The client device 110 may run an HTTP client, e.g., a browsing program, such as MICROSOFT INTERNET EXPLORER or other browser, or a WAP-enabled browser in the case of a cell phone, PDA, or other wireless device, or the like, allowing a user of the client device 110 to access, process, and view information and pages available to it from the provider 140.

In some implementations, the provider 140 may receive queries and may provide indicators of one or more items that are responsive to the query. The items may be a variety of products and/or services (e.g., consumer products) and may include books, consumer electronics, restaurant listings, and airplane schedules, for example. The provider 140 may be a search engine or may be a merchant or other type of provider. The provider 140 may be implemented using one or more computing devices such as the computing system 500 described with respect to FIG. 5.

The provider 140 may have access to structured data 155. The structured data 155 may include one or more structured data tuples organized into one or more sets or tables corresponding to a variety of categories. Each structured data tuple may correspond to an item, and may include one or more attributes corresponding to features of the item that the structured data tuple purports to represent. Each attribute may have one or more attribute values. The structured data 155 may be implemented as a database and/or a collection of tables, or as XML data, for example. Any of a variety of known data structures may be used for the structured data 155.

For example, the provider 140 may be an online retailer and may maintain their inventory as structured data 155. A schema specific to the structured data 155 may be used to generate webpages, catalogs, reports, etc., based on the structured data 155 because of the well defined attributes of the structured data tuples in the structured data 155. Examples of businesses or merchants that may use structured data 155 may include travel websites, movie websites, and libraries.

In some implementations, the provider 140 may receive structured queries and may provide identifiers of one or more items from the structured data 155 in response to the structured queries. A structured query may be a query that uses the schema of the structured data 155 and may specify one or more attributes and one or more attribute values. For example, a structured query for green shoes may be "{Category:shoes, Color:green}". The specified attributes are "Category" and "Color", and the corresponding attribute values are "shoes" and "green". The provider 140 may determine items matching the attribute and attribute value combinations defined by the structured query in the structured data 155 and return indicators of the matching items. In some implementations, the indicators may be URLs (uniform resource locators).

Because users typically do not know or are not aware of the schema used by the provider 140, a user of a client device 110 may provide a structured query using a form or other user interface element that enforces the schema of the structured data 155. Continuing the example described above, the user may use a browser to access a webpage associated with the provider 140. The webpage may include a form that has a drop down box, for example, for one or more attributes of the structured data 155. The user may select "shoes" from a drop down box of available categories, and may select "green" from a drop down box of available colors. The user may submit the form and a corresponding structured query may be generated based on the user selections.

However, because of the popularity of search engines, users have become accustomed to providing free form queries rather than using structured queries. A free form query often includes multiple terms. For example, a user looking to purchase a 42 inch Samsung television would simply enter the query "42 inch Samsung Television" rather than a structured query such as "{Category:Television, Brand:Samsung, Size: 42 inch}".

To facilitate searches on structured data 155 using terms of a free-form or keyword query, the provider 140 may further include a structured query generator 142. The structured query generator 142 may generate one or more possible structured queries from the terms of a received query. In some implementations, the structured query generator 142 may generate a structured query by mapping the terms of the query to attribute values of attributes of a table of the structured data 155. Other methods for generating a structured query may be used. An example system for generating structured queries from free-form or keyword query terms is found in U.S. patent application Ser. No. 12/694,294 titled "Annotating Queries Over Structured Data", the contents of which are hereby incorporated in their entirety.

In some implementations, the provider 140 may receive a query from a client device 110 and provide it to the structured query generator 142 to generate a structured query from the terms of the query. The query may be received from the client device 110 through a user interface implemented using a webpage, for example.

In some implementations, the provider 140 may further include a structured query relaxer 150. The structured query relaxer 150 may "relax" a structured query by substituting one or more of the attribute values of attributes of the structured query with alternative attribute values. Because a user may not be fully aware of the schema used by the structured data 155 and the particular attribute values of the attributes associated with the items in the structured data 155, a user may provide a structured query that may not match many items in the structured data 155. By relaxing one or more of the attribute values of the structured query, more items in the structured data 155 may be found that match the structured query and the user may have a more positive search experience.

For example, consider the example structured data in Table 1, corresponding to television models:

TABLE 1

| Brand | Model | Type | Size |
|---|---|---|---|
| Samsung | XYZ | LCD | 46 |
| Samsung | XYZ | LCD | 46 |
| Sony | Bravia | LCD | 46 |
| Sony | Bravia | Plasma | 42 |
| Sony | Bravia | Plasma | 42 |
| Sony | Bravia | Plasma | 42 |
| Sharp | AAA | LCD | 55 |

As illustrated, Table 1 includes seven items with attribute values corresponding to the attributes "Brand", "Model", "Type", and "Size". A user may generate a structured query such as "{Brand:Samsung, Type:Plasma, Size:46}". Based on the items in Table 1, the structured query provided by the user does not match any of the items in the structured data 155. Accordingly, the provider 140 may provide no indicators of matching items to the user.

However, rather than provide no indicators of items, the structured query relaxer 150 may relax the structured query by changing an attribute value of an attribute with an alternate attribute value. For example, the structured query relaxer 150 may replace the attribute value "Plasma" of the attribute "Type" with the attribute value "LCD" to generate the relaxed structured query "{Brand:Samsung, Type:Plasma, Size:46}". Indicators of the items that match the relaxed structured query may then be provided to the user.

Figure 2:
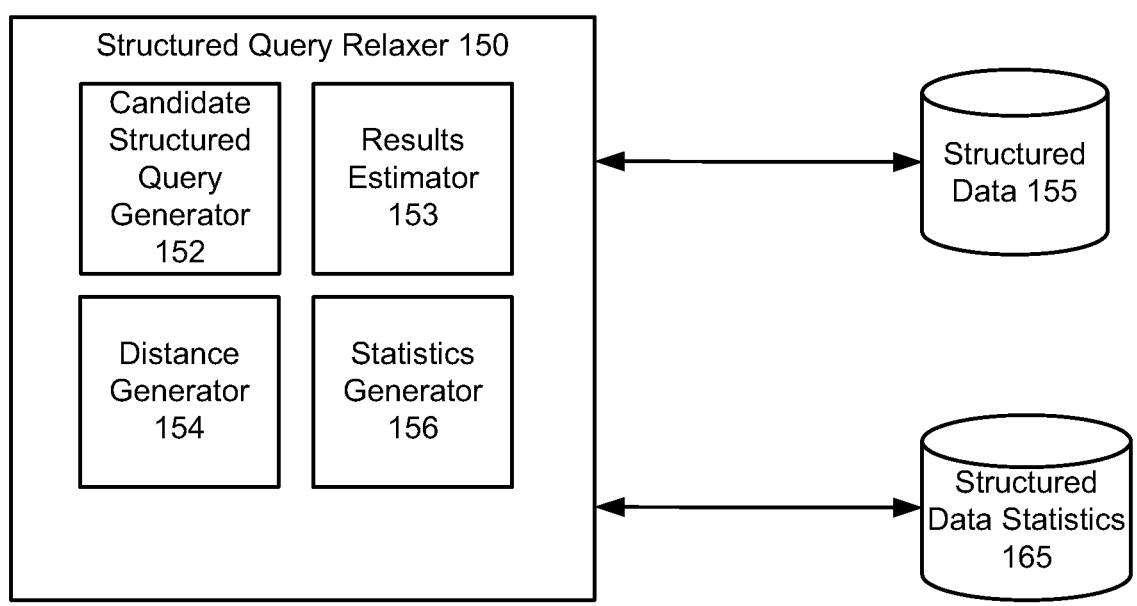
FIG. 2 is an illustration of an example structured query relaxer.

FIG. 2 is an illustration of an example structured query relaxer 150. As illustrated, the structured query relaxer 150 may include several components including a candidate structured query generator 152, a results estimator 153, a distance generator 154, and a statistics generator 156. The structured query relaxer 150, and any of its components, may be implemented using one or more general purpose computing devices such as the computing system 500 described with respect to FIG. 5.

The statistics generator 156 may generate structured data statistics 165 from the structured data 155. In some implementations, the structured data statistics 165 may include a histogram of the attribute values for each attribute in the structured data 155. For example, the histogram for the attribute "Brand" from Table 1 may be Samsung=2, Sony=4, and Sharp=1. As will be described further, the structured data statistics 165 may be used to determine an estimated number of items that may be matched by the provider 140 for a given structured data query.

In some implementations, the statistics generator 156 may further determine dependencies among the attributes in the structured data 155. For example, referring to Table 1, the attributes "Brand" and "Model" may be dependent on one another because only items of the brand Sony are of the model Bravia. Thus, when determining which attribute to relax, the dependent attributes may be relaxed simultaneously since they are dependent on one another. The dependencies among the attributes may be stored by the statistics generator 156 with the structured data statistics 165.

In some implementations, the structured data statistics 165 may further include popularity information such as click information that describes the popularity of previously received structured queries. The popularity information may be used to select alternative attribute values when relaxing a structured query by considering attribute values that have been frequently received or that have resulted in a high click through rate. The statistics generator 156 may generate the popularity information from a query log associated with the provider 140, for example.

The results estimator 153 may determine an estimated number of items in the structured data 155 that are likely to match a structured query using the structured data statistics 165. Because determining the number of items from the structured data 155 may be computationally expensive, an estimated number of matching items may be determined by the results estimator 153 to decide if a structured query may be relaxed and to select among candidate structured queries for the relaxation of the structured query.

In some implementations, the results estimator 153 may determine the estimated number of matches for a structured query by calculating the product of the histogram values of the attribute values for attributes associated with the structured query from the structured data statistics 165. In an implementation, where the attributes are independent, the estimate number of matches may be determined using Equation (1) where $v_i$ represents an attribute value of the attribute $a_i$ in the structured query q and $\delta_i \in [0,1]$:

$$\pi_{a_i \in q} h(a_i, |v_i| \leq \delta_i) \tag{1}$$

The distance generator 154 may determine a distance between a structured query and a relaxed version of the structured query. In an implementation, the distance generator 154 may determine a distance between a structured query q to an item $d_i$ from the structured data 155 using a distance function denoted as $r(d_i, q)$. The distance determined by the distance generator 154 may be used as a check against a proposed relaxed structured query and may represent the distance between the original structured query q the item $d_i$ that matches the relaxed version of q. A high calculated distance may indicate that a relaxed structured query is matching items that are dissimilar to the original structured query, and a low calculated distance may indicate that the relaxed structured query is matching items that are similar to the original structured query. Because a user may abandon their search if matching items are dissimilar to their original query, the structured query relaxer 150 may favor relaxed structured queries having a low determined distance.

In some implementations, the distance function used by the distance generator 154 may have two parts. The first part of the distance function may be structured query dependent, while the second part of the distance function may be based on the overall popularity of the item $d_i$. For example, the distance function may use the popularity information from the structured data statistics 165 to determine the popularity of an item. In addition, the distance generator 154 may determine a distance between attribute values v and w of an attribute a using a distance function denoted as $s(v, w)$.

The particular distance functions used by the distance generator 154 may vary depending on the characteristics of the structured data 155 and the structured data statistics 165. Any of a variety of known monotonic distance and/or scoring functions may be used. A distance function r is monotonic if for any structured query $q=\{a_1q_1, a_2q_2, \ldots, a_wq_w\}$ for any two items $d_i=\{a_1:i_1, a_2:i_2, \ldots, a_w:i_w\}$ and $d_j=\{a_1:j_1, a_2:j_2, \ldots, a_w:j_w\}$ where $s_1(q_1,i_1) \geq s_1(q_1,j_1)$, $s_2(q_2,i_2) \geq s_2(q_2,j_2), \ldots s_w(q_w,i_w) \geq s_w(q_w,j_w)$, it holds that $r(d_i,q) \geq r(d_j,q)$.

The candidate structured query generator 152 may determine some number of candidate relaxed structured queries based on a received structured query. In some implementations, the candidate structured query generator 152 may determine the number of candidate structured queries to generate by retrieving a maximum time, and determining the number of candidate structured queries based on the retrieved maximum time. The maximum time may be set by a user or an administrator and may represent the maximum amount of time that a user may wait for a response to their structured query. Users of search engines or other websites are accustomed to quick responses to queries and will refresh or resubmit their query if no response is received within a short period of time. Therefore, to avoid the user resubmitting and/or abandoning their search, the candidate structured query generator 152 may be limited to a number of candidate relaxed structured queries where the number may be determined, for example, by dividing the maximum time by the expected amount of time it takes to determine and evaluate a candidate structured query.

For example, an administrator may have determined the maximum time to be 0.5 seconds. The candidate structured query generator 152 may determine and evaluate a candidate structured query in 0.01 seconds. Therefore, the candidate structured query generator 152 may determine 50 candidate structured queries (i.e., 0.5/0.01).

The candidate structured query generator 152 may determine a candidate relaxed structured query by changing at least one attribute value corresponding to an attribute of the received structured query. In some implementations, the candidate structured query generator 152 may determine a candidate structured query by selecting an attribute of the received structured query and changing the attribute value corresponding to the selected attribute. The amount that the candidate structured query generator 152 changes an attribute value is referred to as the step size. The larger the step size, the larger the amount of change that may be made to the attribute value. The step size used by the candidate structured query generator 152 may be set by a user or an administrator. Where one or more of the attributes are dependent on other attributes, the candidate structured query generator 152 may change the attribute values of the dependent attributes at the same time.

The candidate structured query generator 152 may determine an estimated number of items that match the structured query with the changed attribute value. The candidate structured query generator 152 may determine the estimated number of items using the results estimator 153, for example. If the estimated number of matching items is greater than a threshold number of items, then the structured query with the changed attribute value may be determined as a candidate structured query.

In some implementations, the candidate structured query generator 152 may select which attribute of the structured query to change the corresponding attribute value using what is referred to as a greedy heuristic. In the greedy heuristic, in a first iteration, the candidate structured query generator 152 may select the attribute which is the most constraining (i.e., whose changing may result in the greatest number of matching results). The least constraining attribute may be determined using the histograms in the structured data statistics 165. In subsequent iterations, the greedy heuristic may select and change different attributes. The amount that the greedy heuristic changes the attribute values may be determined based on the step size set by the user or the administrator.

In some implementations, the candidate structured query generator 152 may select which attribute of the structured query to change the corresponding attribute value, using what is referred to as a dynamic programming heuristic. In the dynamic programming heuristic, multiple attributes may be changed at each iteration. The candidate structured query generator 152 may select the combination of attributes which is the most constraining.

The structured query relaxer 150 may select a structured query from the set of candidate structured queries determined by the candidate structured query generator 152 as the relaxed structured query, and determine items from the structured data 155 that match the relaxed structured query. The structured query relaxer 150 may then provide indicators of the matching items to the user who submitted the original structured query. The indicators may be links such as URLs, in an implementation.

In some implementations, the structured query relaxer 150 may select the structured query from the set of candidate structured queries that has the greatest number estimated matching items. For example, the structured query relaxer 150 may have the results estimator 153 estimate the number of items that match each of the candidate structured queries and the structured query relaxer 150 may select the candidate structured query that has the greatest number of estimated matching items as the relaxed structured query.

In some implementations, the structured query relaxer 150 may select the structured query from the set of candidate structured queries that has the smallest calculated distance from the original structured query. For example, the structured query relaxer 150 may have the distance generator 154 determine the distance between the original structured query and each of the candidate structured queries using the distance function. As described above, the distance function may be a measure of the distance between the original structured query and an item that matches the relaxed structured query. The structured query relaxer 150 may then select the candidate structured query that has the smallest calculated distance as the relaxed structured query.

Figure 3:
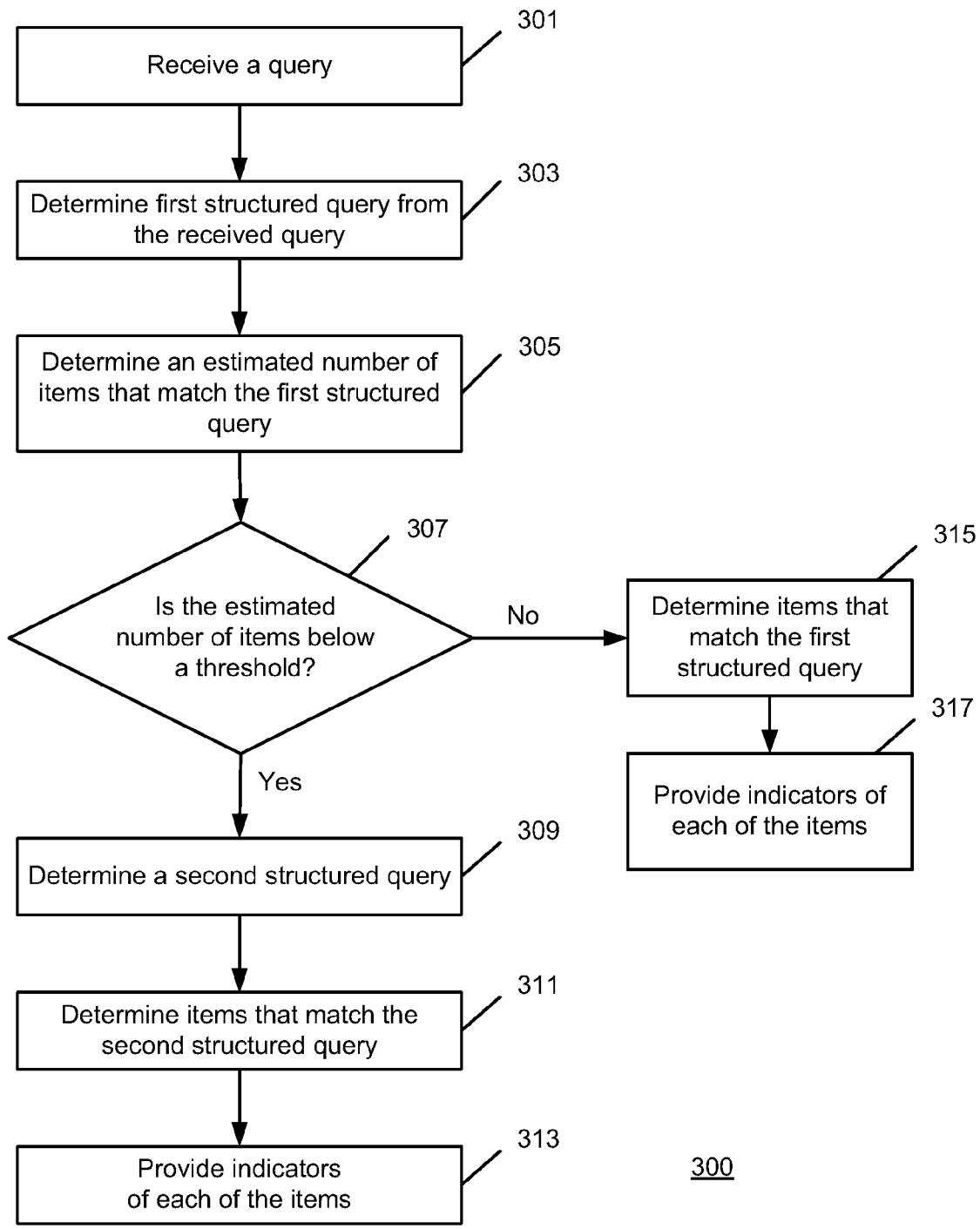
FIG. 3 is an operational flow of an implementation of a method for relaxing a structured query and providing indicators of items matching the relaxed structured query.

FIG. 3 is an operational flow of an implementation of a method 300 for relaxing a structured query and providing indicators of items matching the relaxed structured query. The method 300 may be implemented by the provider 140, for example.

A query is received at 301. In some implementations, the query may be received by the structured query generator 142 of the provider 140 from a user at a client device 110. The query may be a free form query and may comprise one or more terms. In order to fulfill the received query from structured data 155, a structured query may be determined from the terms of the received query.

A first structured query is determined from the received query at 303. The first structured query may be determined from the received query by the structured query generator 142 of the provider 140. The first structured query may include one or more attribute values and each attribute value may be associated with an attribute.

An estimated number of items that match the first structured query is determined at 305. The estimated number of items may be determined by the results estimator 153 of the structured query relaxer 150. In some implementations, the estimated number of items may be determined by the results estimator 153 using the structured data statistics 165. For example, the results estimator 153 may determine the estimated number of items using histograms associated with each attribute of the first structured query in the structured data statistics 165.

A determination is made as to whether the estimated number of items that match the first structured query is below a threshold at 307. In some implementations, the determination may be made by the structured query relaxer 150 of the provider 140. The threshold may represent the minimum number of indicators of items that the provider 140 may return to a user in response to receiving a structured query. If the estimated number of items that match the first structured query is below the threshold, then the method 300 may continue at 309; otherwise, the method 300 may continue at 315.

A second structured query is determined at 309. The second structured query may be determined by the structured query relaxer 150 of the provider 140. In some implementations, the second structured query may be determined by changing one or more attribute values of one or more attributes of the first structured query. For example, the structured query relaxer 150 may generate a set of candidate structured queries, estimate the number of matching items for each of the candidate structured queries, and select the candidate structured query with the highest estimated matching items as the second structured query. The number of candidate structured queries generated may be proportional to a maximum time. In some implementations, the candidate structured queries may be determined using a greedy or a dynamic programming heuristic.

A plurality of items that match the second structured query are determined at 311. The matching items may be determined by the provider 140 from the structured data 155. The matching items may each have associated attributes with attribute values that match the attributes and attribute values of the second structured query.

Indicators of each of the items are provided at 313. The indicators may be provided by the provider 140 to a user who submitted the first structured query. In some implementations, the indicators may be links such as URLs to each of the items in the structured data 155. In addition, pictures or other descriptions of the items may be provided to the user for display, e.g., adjacent to the indicators.

If the estimated number of items is above (i.e., not below) the threshold at 307, a plurality of items that match the first structured query are determined at 315. The matching items may be determined by the provider 140 from the structured data 155. Indicators of each of the items are provided at 317. The indicators may be provided by the provider 140 to the user who submitted the first structured query.

Figure 4:
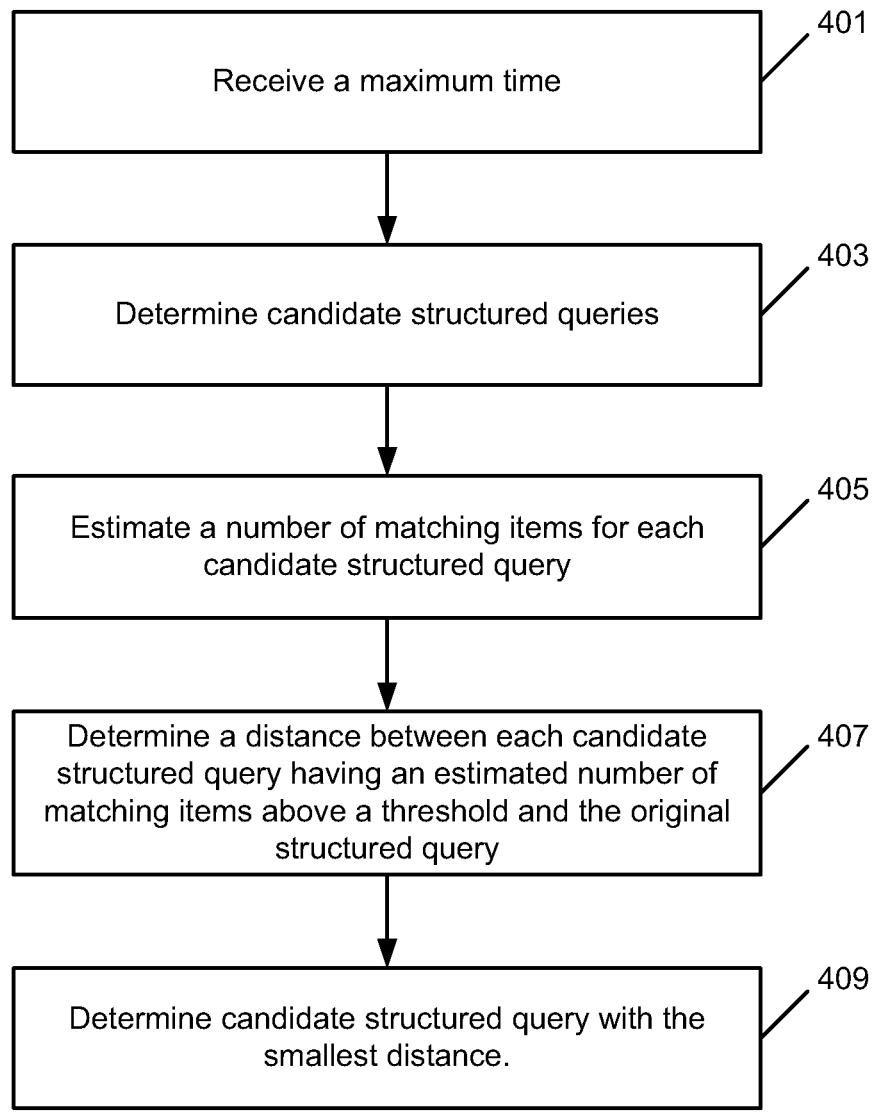
FIG. 4 is an operational flow of an implementation of a method for determining one or more candidate structured queries.

FIG. 4 is an operational flow of an implementation of a method 400 for determining one or more candidate structured queries. The method 400 may be implemented by the provider 140, for example.

A maximum time is received at 401. The maximum time may be received by the structured query relaxer 150 of the provider 140. In some implementations, the maximum time may be set by a user or an administrator and may be a maximum time that the structured query relaxer 150 may consider candidate structured queries for the relaxed structured query. Because users expect a response in a short amount of time, the structured query relaxer 150 may be limited to considering candidate structured queries to a period corresponding to, or determined based on, the maximum time.

A plurality of candidate structured queries is determined at 403. The plurality of candidate structured queries may be determined by the candidate structured query generator 152 of the structured query relaxer 150. In some implementations, the number of candidate structured queries that is generated is proportional to the received maximum time and the amount of time used to determine and consider a candidate structured query. For example, if the received maximum time is one second and the amount of time needed to determine and consider a candidate structured query is 0.2 seconds, then the candidate structured query generator 152 may determine five candidate structured queries (i.e., 1/0.2=5).

In some implementations, the candidate structured queries may be generated by the candidate structured query generator 152 by changing an attribute value of an attribute of the received structured query. In some implementations, the candidate structured query generator 152 may select the attribute to change that may result in the greatest number of matching items based on the number of items in the structured data that include the selected attribute. In other implementations, the candidate structured query generator 152 may randomly select an attribute to change. Other methods of selecting an attribute may be used.

A number of matching items is estimated for each candidate structured query at 405. The number of matching items for each candidate structured query may be estimated for each candidate structured query by the results estimator 153 of the structured query relaxer 150 using the structured data statistics 165, for example.

A distance between each candidate structured query and the original received structured query is determined at 407. The distance may be determined by the distance generator 154. The distance may represent an estimated distance between the original query and an item that is responsive to the candidate structured query. Any distance function or technique may be used.

The candidate structured query with the smallest determined distance is determined at 409. The candidate structured query with the smallest distance may be determined by the structured query relaxer 150 of the provider 140. The candidate structured query with the smallest distance is the candidate structured query that is the most similar to the original structured query and will therefore match items in the structured data 155 that are the most similar to the items that would have matched the original structured query. Therefore, the structured query relaxer 150 may use the candidate structured query with the smallest distance as the relaxed structured query.

Figure 5:
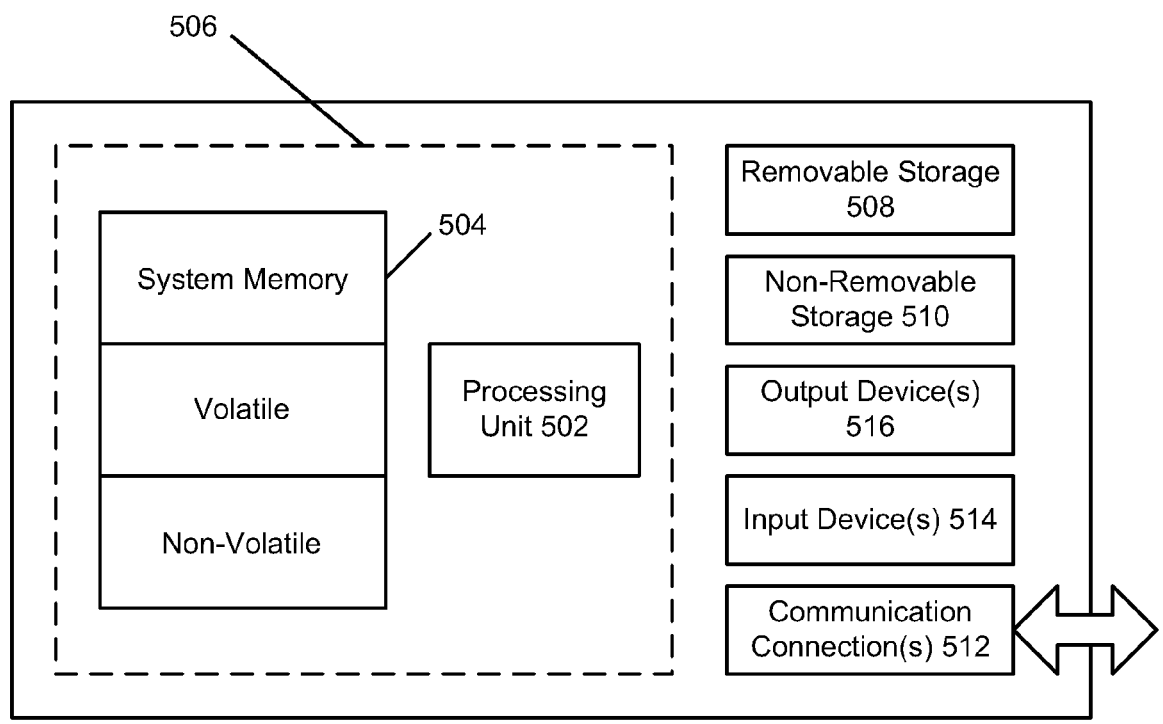
FIG. 5 is a block diagram of a computing system environment according to an implementation of the present system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communications connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   determining an estimated number of items that match a first structured query by a computing device, wherein the first structured query comprises one or more attributes values and each attribute value is associated with an attribute;
   determining if the estimated number of items is below a threshold number of items by the computing device; and
   if the estimated number of items is below the threshold number of items:
      determining a plurality of candidate structured queries from the first structured query by the computing device, wherein the number of candidate structured queries in the plurality of candidate structured queries is proportional to a maximum time, wherein the number of candidate structured queries is determined by dividing the maximum time by the expected amount of time it takes to determine and evaluate a candidate structured query;
      for each candidate structured query of the candidate structured queries, estimating a distance between an item that matches the candidate structured query and the first structured query based on the attribute values associated with the first structured query, one or more attribute values associated with the item that matched the candidate structured query, and popularity information associated with the item that matched the candidate structured query by the computing device;
      determining the candidate structured query with a smallest determined distance as a second structured query by the computing device;
      determining a plurality of items that match the second structured query by the computing device; and
      providing indicators of each of the determined plurality of items by the computing device through a network.

2. The method of claim 1, further comprising:
   if the estimated number of items is above or equal to the threshold number of items:
      determining a plurality of items that match the first structured query by the computing device; and
      providing indicators of each of the determined plurality of items by the computing device.

3. The method of claim 1, further comprising:
   for each candidate structured query of the plurality of candidate structured queries, estimating a number of items that match the candidate structured query; and
   determining the candidate structured query with the highest estimated number of items as the second structured query.

4. The method of claim 1, wherein determining a candidate structured query from the first structured query comprises:
   selecting an attribute of the first structured query;
   changing the attribute value corresponding to the selected attribute;
   determining an estimated number of items that match the first structured query with the changed attribute;
   determining if the estimated number of items that match the first structured query is less than the threshold number of items; and
   if so, determining the first structured query with the changed attribute as a candidate structured query.

5. The method of claim 1, wherein the items are consumer products.

6. The method of claim 1, further comprising:
receiving a query, wherein the query comprises one or more terms; and
determining the first structured query based on the terms of the received query.

7. The method of claim 1, further comprising receiving the first structured query through a form of a webpage.

8. The method of claim 1, wherein the plurality of candidate structured queries is determined from the first structured query using a greedy heuristic.

9. The method of claim 1, wherein the plurality of candidate structured queries is determined from the first structured query using a dynamic programming heuristic.

10. The method of claim 1, wherein determining the estimated number of items that match the first structured query comprises determining the estimated number of items using popularity information associated with previously received queries.

11. A method comprising:
receiving a first structured query by a computing device, wherein the first structured query comprises one or more attributes values and each attribute value is associated with an attribute;
determining a second structured query from the first structured query by the computing device, wherein the second structured query comprises at least one attribute value that is different than the one or more attribute values of the first structured query, and wherein determining the second structured query from the first structured query comprises:
determining a plurality of candidate structured queries from the first structured query, wherein the number of candidate structured queries in the plurality of candidate structured queries is proportional to a maximum time, wherein the number of candidate structured queries is determined by dividing the maximum time by the expected amount of time it takes to determine and evaluate a candidate structured query;
for each candidate structured query of the plurality of candidate structured queries, estimating a distance between an item that matches the candidate structured query and the first structured query based on the attribute values associated with the first structured query, one or more attribute values associated with the item that matched the candidate structured query, and popularity information associated with the item that matched the candidate structure query; and
determining the candidate structured query with the smallest determined distance as the second structured query;
determining a plurality of items that match the second structured query by the computing device; and
providing indicators of each of the determined plurality of items by the computing device.

12. The method of claim 11, further comprising:
for each candidate structured query of the plurality of candidate structured queries, estimating a number of items that match the candidate structured query; and
determining the candidate structured query with the highest estimated number of items as the second structured query.

13. The method of claim 11, wherein determining a candidate structured query from the first structured query comprises:
selecting an attribute of the first structured query;
changing the attribute value corresponding to the selected attribute;
determining an estimated number of items that match the first structured query with the changed attribute;
determining if the estimated number of items that match the first structured query with the changed attribute is above a threshold number of items; and
if so, determining the first structured query with the changed attribute as a candidate structured query.

14. The method of claim 11, further comprising receiving a maximum time, wherein the number of determined candidate structured queries is proportional to the maximum time.

15. The method of claim 11, wherein the items comprise consumer products.

16. A system comprising:
at least one computing device; and
a provider that:
receives a first structured query, wherein the first structured query comprises one or more attributes values and each attribute value is associated with an attribute;
determines an estimated number of items that match the first structured query;
determines if the estimated number of items is below a threshold number of items; and
if the estimated number of items is below the threshold number of items:
determines a second structured query from the first structured query,
wherein the second structured query comprises at least one attribute value that is different than the one or more attribute values of the first structured query,
determines a plurality of items that match the second structured query; and
provides indicators of each of the determined plurality of items, wherein the provider determines the second structured query from the first structured query by:
determining a plurality of candidate structured queries from the first structured query, wherein the number of candidate structured queries in the plurality of candidate structured queries is proportional to a maximum time, wherein the number of candidate structured queries is determined by dividing the maximum time by the expected amount of time it takes to determine and evaluate a candidate structured query;
for each candidate structured query of the plurality of candidate structured queries, estimating a distance between an item that matches the candidate structured query and the first structured query based on the attribute values associated with the first structured query, one or more attribute values associated with the item that matched the candidate structured query, and popularity information associated with the item that matched the candidate structure query; and
determining the candidate structured query with the smallest determined distance as the second structured query.

17. The system of claim 16, wherein if the estimated number of items is above or equal to the threshold number of items, the provider further:
determines a plurality of items that match the first structured query; and
provides indicators of each of the determined plurality of items.

18. The system of claim 16, wherein the provider further:
for each candidate structured query of the plurality of candidate structured queries, estimates a number of items that match the candidate structured query; and
determines the candidate structured query with the highest estimated number of items as the second structured query.

19. The system of claim 16, wherein the provider determines a candidate structured query from the first structured query by:
selecting an attribute of the first structured query;
changing the attribute value corresponding to the selected attribute;
determining an estimated number of items that match the first structured query with the changed attribute;
determining if the estimated number of items that match the first structured query with the changed attribute is above the threshold number of items; and
if so, determining the first structured query with the changed attribute as a candidate structured query.

* * * * *